(No Model.)

P. MEDART.
MACHINE FOR GRINDING PULLEY SPIDERS.

No. 256,441. Patented Apr. 11, 1882.

ATTEST:
Robert Burns

INVENTOR:
Philip Medart

N. PETERS, Photo-Lithographer, Washington, D. C.

UNITED STATES PATENT OFFICE.

PHILIP MEDART, OF ST. LOUIS, MISSOURI.

MACHINE FOR GRINDING PULLEY-SPIDERS.

SPECIFICATION forming part of Letters Patent No. 256,441, dated April 11, 1882.

Application filed September 5, 1881. (No model.)

*To all whom it may concern:*

Be it known that I, PHILIP MEDART, a citizen of the United States, and a resident of the city of St. Louis, in the State of Missouri, have invented certain new and useful Improvements in Machines for Grinding Pulley-Spiders, of which the following is a specification.

The present invention relates to the construction of a machine for grinding off the ends of the arms of pulley spiders or centers made use of in that class of belt-pulleys in which the rim is of wrought-iron and made separate from the spider, and subsequently attached thereto by means of rivets or bolts; and this invention consists in certain combination of parts and details of construction, as will hereinafter more fully appear.

Figure 1:
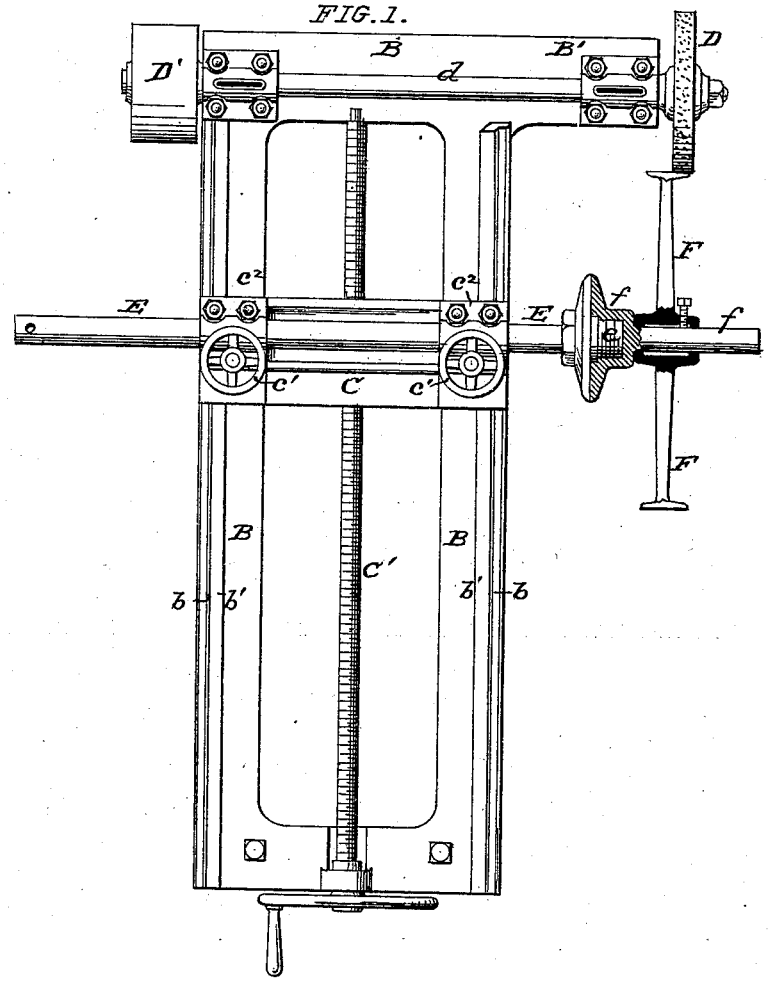
Figure 2:
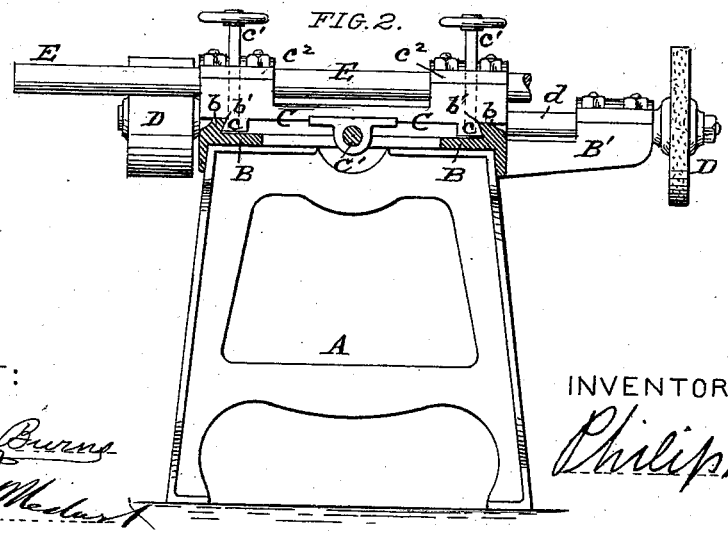

In the drawings, Figure 1 is a top plan, and Fig. 2 a vertical section, of my improved machine.

Referring to the drawings, A represents the feet or legs supporting the bed or shears B of the machine, having side guides, $bb$, upon which the carriage C slides, and is held down in position by the overhanging lips $b'$ engaging over the lugs $c$ on the bottom of the carriage C, the parts being locked in position by hand-screws $c'$ $c'$, the ends of which have bearing against the bed B, as shown, so that when turned down they will act to force the faces of the lips $b'$ and lugs $c$ together, so as to clamp the parts in position. By this means a very effective clamping of the carriage in its desired position is attained, and any danger of the parts being forced out of position by the impact of the grinding-wheel entirely prevented.

The carriage C is fed along the shears B by a stationary endless screw, $c'$, having bearing in said shears, in the manner clearly indicated in Fig. 1 of the drawings. At its front end the shears B is formed with a side extension, B', at the outer end of which is arranged an emery or other suitable grinding-wheel, D, the shaft $d$ of which extends across the shears B, and provided with bearings at each end, as clearly indicated in Fig. 1. D' is the driving-pulley for the shaft $d$.

The device for holding the pulley spider or center while the ends of its arms are being ground off concentric with its axis consists of a turning arbor or shaft, E, supported in journals or bearings $c^2$ $c^2$ of the carriage C, and provided at its end with a screw-threaded head, $e$, onto which screws the chuck or mandrel $f$, that carries the pulley spider or center F.

The arbor E is capable of both a rotary movement in its supporting-bearings $c^2$, and an endwise or lateral movement through the same, which movements are performed by the operator as required during the process of grinding off the ends of the spider-arms, the arrangement of parts as herein shown acting as an accurate and effective guide for directing the face of the arms to the grinding-wheels, so that they will be accurately ground off concentric with and parallel to the axis of the spider.

During the process of grinding the spider-arms furnish a ready means for the operator to grasp and perform the different movements required, and no other provision is required in the machine by which to effect such movements.

It will be seen that the grinding-wheel D is arranged at some distance out from the side of the main frame B, and that the attaching-head $e$ of the arbor E overhangs said frame. The purposes of this arrangement and the advantages derived therefrom are, first, it permits of the grinding of very large spiders with a comparatively small-sized machine; second, it permits of an easy and accurate attachment of the spider-carrying mandrel or chuck, and also the easy access of the operator to the spider, so as to handle the same during the grinding operation; third, it greatly facilitates the changing of the size of the pulley-chucks or mandrels to suit the different-sized bore of pulley-spiders without requiring the unshipping of any portion of the machine.

The mode of operation of the machine is as follows: The pulley-spider F is secured to the arbor E by means of its carrying-mandrel $f$, and the carriage C is fed forward so as to bring the spider-arms in the path of the emery-wheel. The operator then, by grasping the spider-arms, can bring the different arms in contact with and draw them across the face of the wheel, so as to grind them all off concentric to and parallel with axis of the spider.

The advantages attained by effecting the movement or feed of the parts by hand over an automatic movement are that, owing to the varying amount of material to be removed from the ends of the spider-arms, due to irregularities in casting, a regular or uniform forced feed cannot be used practically without liability to springing or breaking of the parts. With a hand-feed, as in the present invention, the amount of feed and force with which it is applied is completely under control, and can be regulated and modified to meet in a very perfect manner the irregularities, &c., met with in the spider-castings, and the removal of the same is attained in a very perfect manner without any danger of springing or breaking of the parts.

Having thus fully described my said invention, what I claim as new, and desire to secure by Letters Patent, is—

1. In a grinding-machine for pulley-spiders, the combination of a spider-carrying arbor having its carrying-head overhanging the side of the main bed or shears and supported in suitable bearings, so that it can be moved endwise and rotated by hand, with a grinding-wheel the axis of which is in a parallel line with the axis of the carrying-arbor, substantially as described.

2. In a grinding-machine for pulley-spiders, the combination of an adjustable carriage, having beveled lugs $c$, the bed or shears B, having corresponding guides or lips, $b$, and hand-screws $c'$ $c'$, the ends of which have bearing against the bed B, substantially as described, and for the purpose set forth.

3. In a grinding-machine for pulley-spiders, the combination of a spider-carrying arbor having its carrying-head overhanging the side of the main bed or frame and supported in suitable bearings, so that it can be rotated and moved endwise by hand, and a bed or frame having a side extension, B', supporting an emery-wheel at its outer end, the axis of which is in a parallel line with the axis of the carrying-arbor, substantially as described.

In testimony whereof I have hereunto set my hand, at St. Louis, Missouri, this 2d day of September, 1881.

PHILIP MEDART.

In presence of—
ROBERT BURNS,
WM. MEDART.